No. 771,330. PATENTED OCT. 4, 1904.
H. D. SMITH & J. B. ROBINSON.
DEVICE FOR COLLECTING TURPENTINE.
APPLICATION FILED MAR. 9, 1904.
NO MODEL.
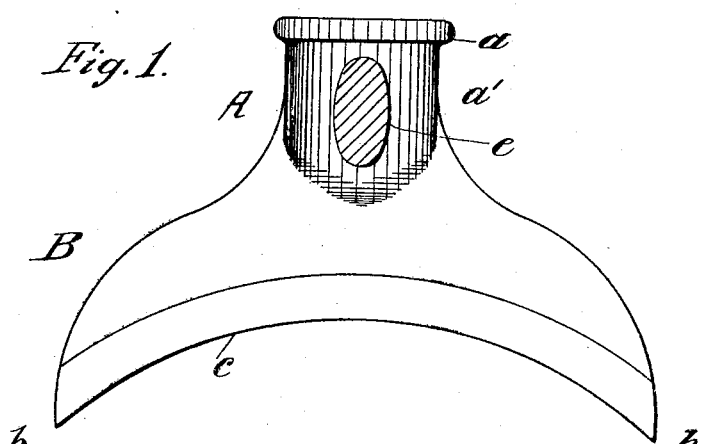
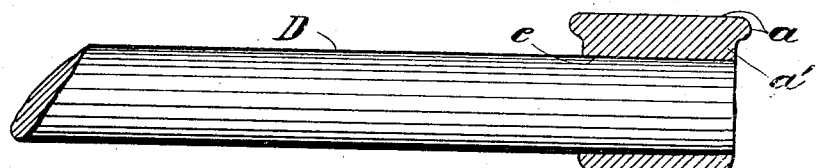
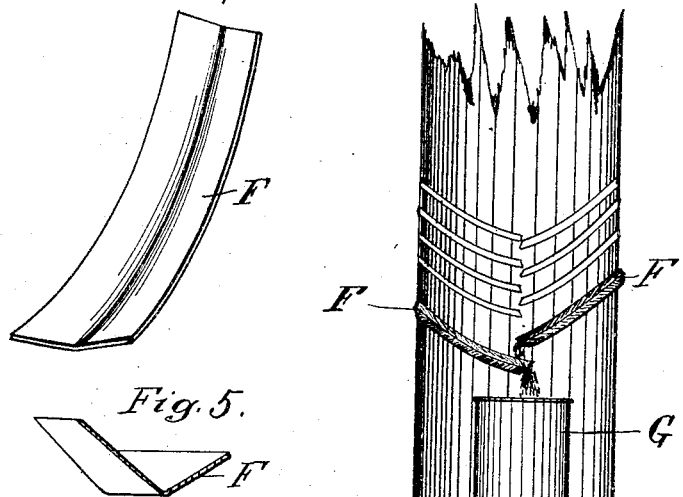
Witnesses
Wm Boyd
E. B. Clark
Inventors
Hosea D. Smith
John B. Robinson
By Freed Parlow
Attorneys No. 771,330. Patented October 4, 1904.

UNITED STATES PATENT OFFICE.

HOSEA D. SMITH AND JOHN B. ROBINSON, OF CECIL, GEORGIA.

DEVICE FOR COLLECTING TURPENTINE.

SPECIFICATION forming part of Letters Patent No. 771,330, dated October 4, 1904.

Application filed March 9, 1904. Serial No. 197,267. (No model.)

*To all whom it may concern:*

Be it known that we, HOSEA D. SMITH and JOHN B. ROBINSON, citizens of the United States, residing at Cecil, in the county of Berrien and State of Georgia, have invented new and useful Improvements in Devices for Collecting Turpentine, of which the following is a specification.

This invention relates to implements for collecting turpentine from pine-trees.

The object of our invention is to provide for conveniently applying curved or semicircular troughs or gutters to the circumferential portion of trees for effectively catching and conveying the outflowing turpentine to a receptacle so as to avoid scarring the tree and to prevent waste of turpentine.

The object of our invention is secured by means of our improved ax having a cutting-blade with the edge curved inward from the outer corners toward the central shank or head, so as to conform approximately to the circumference of a tree.

The improved features of construction constituting our invention will be set forth in the claim.

We will now describe our devices by reference to the accompanying drawings, in which—

Figure 1 represents a front elevation of our ax. Fig. 2 represents a vertical transverse section thereof. Fig. 3 represents an elevation of a tree-trunk, showing our curved gutters applied thereto for collecting turpentine. Figs. 4 and 5 represent perspective views of a portion of a curved gutter.

Our ax is of peculiar construction to adapt it for making a clean incision through the bark and conforming approximately to the curvature of a tree to receive one edge of our curved gutter, as indicated in Fig. 3.

The ax A is made with a short flat head $a$, which may be circular, a short strong shank $a'$, containing the eye $e$ for the handle, and a broad crescent-shaped blade B. The eye $e$ is preferably formed in the shank crosswise of the blade, and a handle D is secured therein. The blade B is made with oppositely-curved outer edges extending from the shank to the outer corners $b$, and the cutting edge $c$ is curved inward or made concave from the corners toward the central shank at the rear, so as to be adapted to partly encircle a tree and make a concentric incision therein. The edge $c$ is sharpened, so that it may be readily driven a suitable depth into a tree. The shank $a'$, as shown in Fig. 1, is made centrally at the back of the blade and extends transversely inward from the head $a$ toward the cutting edge $c$, so as to make the implement sufficiently strong to receive blows from a maul and be driven at its cutting edge into a tree. The blade B is made flat, so that the edge $c$ shall make an incision which is curved only in conformity with the periphery of a tree. In practice a maul or mallet having its ends bound with iron hoops is used for striking the head $a$ to drive the edge of the blade through the bark into the wood for making curved incisions for insertion of the metal gutters F, as indicated in Fig. 3. A cup G is preferably placed below the lower ends of the gutters for receiving the turpentine.

By the use of these devices the trees are not scarred and injured, and all of the turpentine is caught in the gutters and discharged into the cup, thus insuring economical and advantageous results.

Having described our invention, what we claim, and desire to secure by Letters Patent, is—

An implement for making circumferential incisions in trees, having at the back a central shank extending transversely inward toward the cutting edge, and provided at the outer end with a flat head and containing an eye, and a broad flat blade extending approximately from the center of the shank and having an inwardly-curved or concave cutting edge, substantially as described.

In testimony whereof we affix our signatures in presence of two witnesses.

HOSEA D. SMITH.
JOHN B. ROBINSON.

Witnesses:
T. B. FUTCH,
H. T. OGLETREE.